(12) United States Patent
Mamishev et al.

(10) Patent No.: US 11,417,193 B2
(45) Date of Patent: Aug. 16, 2022

(54) SOCIAL DISTANCING REMINDER DEVICE

(71) Applicants: Maxwell A. Mamishev, Seattle, WA (US); Anthony X. Zhang, Seattle, WA (US); Vincent X. Zhang, Seattle, WA (US); Limin Zhang, Seattle, WA (US)

(72) Inventors: Maxwell A. Mamishev, Seattle, WA (US); Anthony X. Zhang, Seattle, WA (US); Vincent X. Zhang, Seattle, WA (US); Limin Zhang, Seattle, WA (US)

( * ) Notice: Subject to any disclaimer, the term of this patent is extended or adjusted under 35 U.S.C. 154(b) by 0 days.

(21) Appl. No.: 17/239,585

(22) Filed: Apr. 24, 2021

(65) Prior Publication Data
US 2021/0335120 A1 Oct. 28, 2021

Related U.S. Application Data

(60) Provisional application No. 63/015,597, filed on Apr. 26, 2020.

(51) Int. Cl.
*G08B 21/24* (2006.01)
*G06T 7/521* (2017.01)
*G08B 7/06* (2006.01)
*G08B 21/02* (2006.01)
*G08B 5/36* (2006.01)
*G08B 21/18* (2006.01)

(52) U.S. Cl.
CPC .............. *G08B 21/24* (2013.01); *G06T 7/521* (2017.01); *G08B 5/36* (2013.01); *G08B 7/06* (2013.01); *G08B 21/02* (2013.01); *G08B 21/185* (2013.01)

(58) Field of Classification Search
CPC ..................................... G08B 21/24
See application file for complete search history.

(56) References Cited

U.S. PATENT DOCUMENTS

2021/0248890 A1* 8/2021 Shaw .................. G08B 21/182

* cited by examiner

*Primary Examiner* — Travis R Hunnings
(74) *Attorney, Agent, or Firm* — Krystyna Szul

(57) ABSTRACT

A wearable Social Distance Reminder (SDR) device can signal that a preset distance between the device and an individual has been breached. The device can remind people to maintain a certain predetermined social distance to avoid transfer of airborne pathogens and minimize spread of diseases.

4 Claims, 3 Drawing Sheets

SOCIAL DISTANCING REMINDER DEVICE

CROSS-REFERENCE(S) TO RELATED APPLICATION(S)

This application claims the benefit of U.S. Provisional Application No. 63/015,597, filed Apr. 26, 2020 entitled Distance Reminder Device, which is expressly incorporated herein by reference in its entirety for all purposes.

BACKGROUND

Traditional approaches to prevention of airborne diseases have not been adequate and there usually may be a gap between when a new airborne pathogen first infects someone and when a new treatment or vaccine can be deployed. This issue became especially problematic with the outbreak of SARS-CoV-2. To help alleviate the severity of the issue and bridge the gap, social distancing, especially indoors, has been recommended by every health organization including the CDC, the WHO, the ECDC, the CCDC, and the JCDC. However, social distancing itself is a time and energy consuming habit to develop. It can be difficult to consistently accomplish because one must constantly keep a mindful track of their distance from other people. Moreover, even if one tries to always keep a mindful distance, humans may not be always accurate at estimating the distance. As such, this can be tiring and can easily fail because it may be difficult to know when someone is at least at the recommended distance away, such as six feet or two meters. This, in turn, is a problem because the deadly disease can be highly contagious and its chances of transfer increase with a smaller physical distance between people.

Even if there is a treatment developed for some of the more problematic, deadly airborne diseases, keeping six feet of a distance can be helpful in preventing many other airborne diseases, including the common flu. As such, there is a need for tools, devices, and methods that can teach good distance habits, guide on how to keep the recommended social distance, remind when breach is or has occurred, an/or reassure when it is being kept.

SUMMARY

This summary is provided to introduce a selection of concepts in a simplified form that are further described below. This summary is not intended to identify key features of the claimed subject matter, nor is it intended to be used as an aid in determining the scope of the claimed subject matter.

Embodiments of the present disclosure provide a Social Distance Reminder (SDR) device, a small, lightweight, wearable sensor configured to provide feedback by way of a signal that a preset distance between the sensor and an individual has been breached. In some embodiments, the signal can be known only to the wearer of the device. In other embodiments, the device can also be configured to emit a signal, whether visual or audible, to the wearer as well as any person in the vicinity of the wearer wearing the device. In some embodiments, the signal for the wearer can be different from the signal emitted to people near the wearer, and in some, it can be the same type of signal. For example, when the wearer wears the device, he/she may not always be able to notice the visual alert. In such cases, the device can also be configured to provide the vibration or tactile feedback to the wearer while providing flashing light that may increase or decrease in intensity to another person approaching the wearer. The vibration, in some embodiments could be also heard by the wearer and the approaching person in the vicinity.

The signal can be a feedback alert such as a vibration, a sound, or a visual signal, for example a light on the sensor changing from green, signifying distance is proper, to red, signifying distance is narrowing. The visual reminder can change in signal intensity, or go from green, to yellow, to red, in the order of the urgency. In embodiments, there can be different sizes and placement, or positioning of the light output or outlet to be emitted through. For example, a smaller, a medium, and a larger windows to emit the light as the distance decreases. This arrangement may also be useful when someone is color blind, for example, and may not be able to readily perceive the difference between green and red light being emitted from the same window/outlet. Alternatively, the visual area of light being emitted can change depending on proximity. The visual can also be arranged to show the light as a thermometer, barometer, charge-like distance proximity sensory indicators that can capture attention and serve as reminders to increase the distance. Other types of signal representations are possible.

In one example the type of feedback signal emitted by the device can be an alarm or feedback, which can be selected based on individual wearer's preferences and/or the wearer's environment. If a wearer attends a gathering where silence is expected, the device can be adjusted to only use the visual and/or tactile feedback. If a wearer is in a loud environment, such as a rock concert, the feedback can be adjusted to be vibration and visual and audio. Yet, in another example, when a wearer does not wish the audio nor the visual feedback, the wearer can change the selection/setting to only require vibration.

The device can be configured to take a variety of shapes and designs including round square device to be removably attachable to an individual, a user of the device. In one example, when the device detects the distance between the wearer wearing the device and at least one other person in the vicinity of the device. The device can be configured to beep, flash warnings, buzz, announce to keep six (6) or more feet of distance, etc.

The device comprises a sensor, and a processor or a chip. The processor processes the sensed signals from the sensor and outputs the results by way of feedback and/or alerts. The outputted results can include at least one, or a combination of an LED, a vibrator, and a speaker.

Other features and advantages of the disclosure will become apparent from the following detailed description made with reference to the accompanying drawings.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
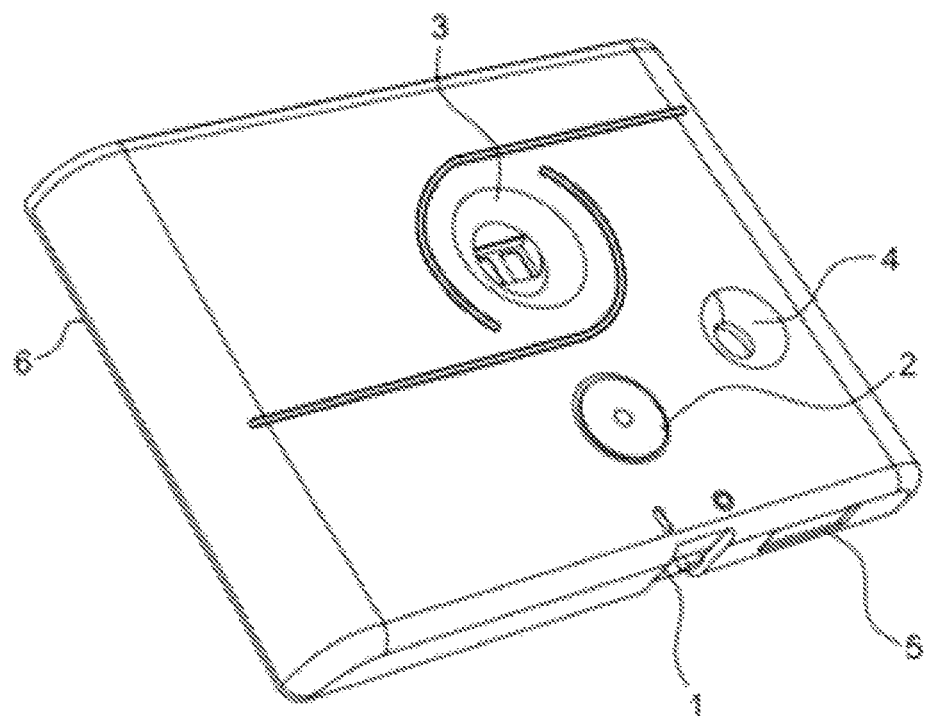
FIG. 1 is an isometric illustration of the Social Distancing Reminder's front side, made according to embodiments.

The description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The presently disclosed device and methods are suitable for a wearable distance sensing and alerting device. The device can be configured to take a variety of shapes and designs including round square device to be removably attachable to an individual, a user of the device. In one example, when the device detects the distance between the wearer wearing the device and at least one other person in the vicinity of the device. The device can be configured to beep, flash warnings, buzz, announce to keep six (6) or more feet of distance, etc.

In one embodiment, the device comprises a proximity sensor, a speaker, battery, LED lights, a tactile feature, such as a button or touch field/screen, a microprocessor configured to process the signal input from the proximity sensor, such as an infrared sensor and activate the LED light.

Embodiment methods of determining, monitoring, and alerting according to changing distance levels in between people which facilitate more accurate and efficient tracking of distance are also described.

One aspect of the present disclosure is a method of measuring the distance to other people and alerting both the device user, who is likely wearing the device, and other people that they are now closer to each other than the threshold distance, i.e., the recommended social distance.

The device, as exemplified in FIGS. 1-5 measures the distance from the device aperture to the nearest object and emits feedback alert when this distance is less than the threshold distance. For example, social distance of 6 feet was recommended during COVID-19 outbreak. To detect that the person is entering the "danger" zone, meaning the recommended social distance is breached, the device utilizes one or more sensors, for example and infrared, an ultrasonic, or a time-of-flight laser sensor.

In one embodiment, presently disclosed is a device that detects presence of a person within a range of its proximity sensor and gives a signal for the wearer of the device to understand that another person is within certain distance of the wearer/device. The device can also emit a signal where a nonwearer, such the person who entered space detected by the device may be alerted to keep certain distance and not come any closer. For example, when the distance is about to be compromised or has been compromised, the device may alert by intensity in tactile, visual signals. It may also have an auditory alert, for example: "This is a social distancing alert. Maintain 6 feet. You are too close. Increase your distance from other people."

In a further embodiment, the device can be configured to detect any object a wearer wishes to keep a distance from or to detect within wearer's space. The device can be implemented with, for example, visually impaired people who wish to avoid objects in their path or find certain objects in their path.

An auditory reminder for the wearer can be made with a piezo electric buzzer that emits a beeping sound when it detects another object or person within predetermined number of feet from the sensor.

In one embodiment, the device warns when somebody enters into a zone between 12 feet and 1 foot from the sensor. The device is scanning the area around it. With this, it is able to pick up other people entering the zone of detection. The device can then begin to emit a sound, vibration, or a visible light. A user is able to customize which of these alert types they choose. This is done with the microprocessor. The microprocessor picks up the data from the sensor and calculates whether to emit the signal. The device, in some embodiments, can immediately begin to emit the sound. The zone has a 35-degree field of view. Inside the zone, the device can detect anything that enters the zone, which is also be referred to here as the zone of detection. The distance can be set to whatever a user/wearer wants it to be. If the user decides to change the distance to 4 or 7 feet, the device begins beeping at what the user set it to beep at. In one embodiment, the zone has a circumference of 7.33 feet.

In one embodiment, when the device is turned on or worn, the sensor can periodically, or when activated by motion for example, or a combination of both periodic checking and motion activation, read the distance of the nearest object from it that is in the zone of detection, and send the data to a processor. The processor analyses the data and if the distance measured is more than 6 feet, for example, the sensor and processor can continue to work together to monitor the distance from the nearest object in the zone of detection. If the nearest object in the zone of detection is equal to or less than 6 feet away then the processor emits an alert. One example of an alert is activation of a beeping buzzer. Another example is an alert emitting a light in a certain color, or a flashing light. Intensity of the alert beeps and light can also be used with the decreasing distance.

In a further embodiment, the device comprises a data log or memory module and is configured to record a time and day the social distance was breached. The recorded data can be retrieved on demand. Alternatively, the recorded data can be sent to another device, such as a cell phone. In a further embodiment, the device sends time and date of the breach as the breach occurs and can automatically also send this information to a mobile device when the mobile device such as a phone or a tablet are nearby. In yet further embodiment, the phone or the tablet, upon receiving the data from the SDR device can determine location the breach occurred and store this information for later retrieval, if needed.

FIG. 1 illustrates an embodiment drawing of the device. The device depicted in FIG. 1 comprises a housing, which is also referred to as a case or a shell, with a battery port on the back side of the device as further shown in FIG. 5. A buzzer inside the case is not visible. The device further comprises a power switch 1, a button 2, a sensor 3, a feedback module 4, a charging module 5, data record and transfer module 6.

In embodiments, the device can turn itself on by sensing presence and turned off by a lack of presence of a different object. The button 2, can be a pause button or a settings button. The feedback module 4 can be display such as an LED display. The feedback module 4, can be a speaker, a tactile buzzer, or a combination of two or more types of feedbacks. A microUSB port, a battery, a solar charger, a capacitive charger, an electric outlet, or other type of charging sources can be used as a charging module 5 and a data transfer module 6.

In one example, still referring to the invention of FIG. 1, when the button 2 is pressed, the device distance detecting stops and the display LED turns into a bluish green hue. The sensor 3 is on when the device is on. When the button 2 is pressed, the sensor 3 is active, the output systems temporarily stop. In an embodiment, the device switch 1 can be located cusped in the bottom side of the SDR, the button 2, and the sensor 3 are located next to each other in the front portion of the device while the feedback module 4 can be located in a corner of the SDR facing a direction the sensor is pointing. The device can be configured to have smooth edges on some sides and a less smooth edge on the other sides.

For users who are visually impaired or have difficulty hearing, a vibrating buzzer can be used instead of, or in addition to an auditory and/or visual signal output. An alert signal can include vibration and can further include different levels of intensity or pattern of vibration for different degree of urgency.

In some embodiments, the signal can be known only to the wearer of the device. In other embodiments, the device can also be configured to emit a signal, whether visual or audible, to the wearer as well as any person in the vicinity of the wearer wearing the device. In some embodiments, the signal for the wearer can be different from the signal emitted to people near the wearer, and in some, it can be the same type of signal. For example, when the wearer wears the device, he/she may not always be able to notice the visual alert. In such cases, the device can also be configured to provide the vibration or tactile feedback to the wearer while providing flashing light that may increase or decrease in intensity to another person approaching the wearer. The vibration, in some embodiments could be also heard by the wearer and the approaching person in the vicinity.

The signal can be a feedback alert such as a vibration, a sound, or a visual signal, for example a light on the sensor changing from green, signifying distance is proper, to red, signifying distance is narrowing. The visual reminder can change in signal intensity, or go from green, to yellow, to red, in the order of the urgency. In embodiments, there can be different sizes and placement, or positioning of the light output or outlet to be emitted through. For example, a smaller, a medium, and a larger windows to emit the light as the distance decreases. This arrangement may also be useful when someone is color blind, for example, and may not be able to readily perceive the difference between green and red light being emitted from the same window/outlet. Alternatively, the visual area of light being emitted can change depending on proximity. The visual can also be arranged to show the light as a thermometer, barometer-like distance proximity sensory indicators that can capture attention and serve as reminders to increase the distance. Other types of signal representations are possible.

In one example the type of feedback signal emitted by the device can be an alarm or feedback, which can be selected based on individual wearer's preferences and/or the wearer's environment. If a wearer attends a gathering where silence is expected, the device can be adjusted to only use the visual and/or tactile feedback. If a wearer is in a loud environment, such as a rock concert, the feedback can be adjusted to be vibration and visual and audio. Yet, in another example, when a wearer does not wish the audio nor the visual feedback, the wearer can change the selection/setting to only require vibration.

As mentioned, the device can take on a variety of shapes and sizes that can be attached to another object, or removably attached to a person or an item on a person, such as external surface of a hat, a shirt, coat, purse, etc. The housing design, illustrated in FIG. 1-5, is exemplary for the purpose described, but alternate forms or designs can be used to achieve the same objective.

Figure 2:
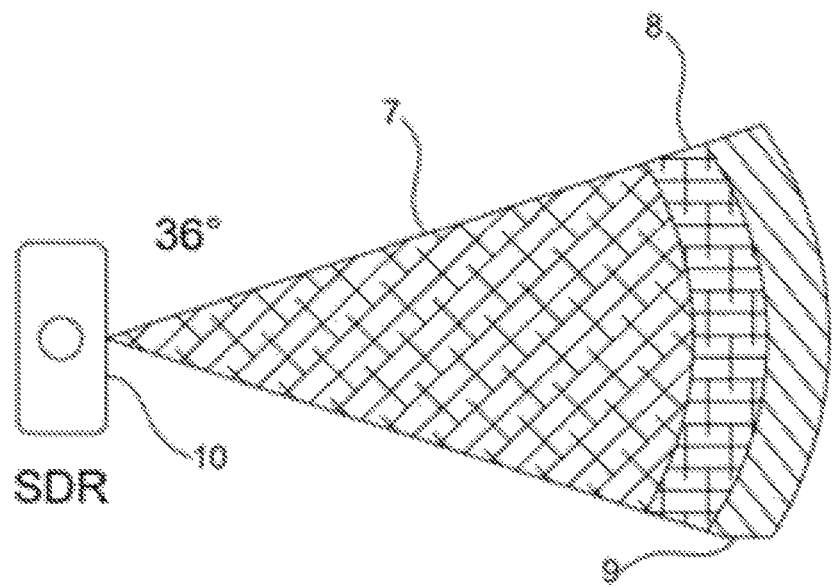
FIG. 2 illustrates an embodiment of the device's range, according to embodiments.

Referring now to FIG. 2, an example of operation the SDR is shown. According to embodiments, the SDR device can detect motion and/or presence or objects and/or people within a predetermined number of feet, such as between 1 and 12. In one embodiment, as shown, one angle of the device 10 can be 36 degrees. The device can activate when it detects someone is within one of three zones, for example. The visualized, portion of the cone in FIG. 2, namely zone 7, illustrates the "red" or "unsafe, or "danger" zone, that is the less than the recommended social distance zone, is when the device would emit some type of a warning, for example a red color flashing, audible alerts, or intensifying tactile feedback. The yellow zone 8 exemplifies a range from 7-8 feet, which can be deemed "close to danger" zone, while the green zone 9 illustrates the "safer" range from 8 feet to 9 feet. Beyond nine feet distance, the device displays no color.

Figure 3:
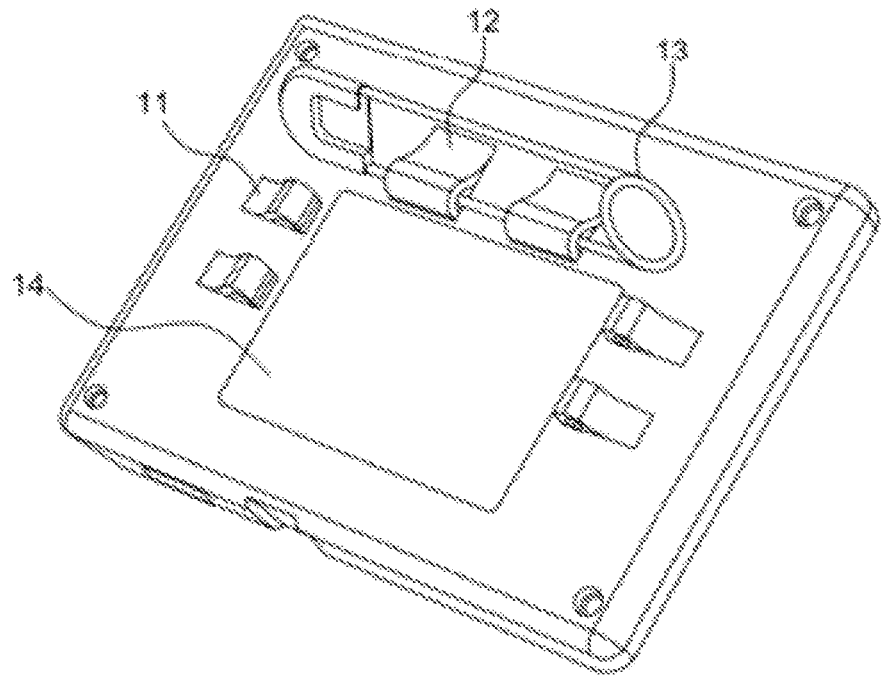
FIG. 3 illustrates an isometric illustration of the Social Distancing Reminder's back side, according to embodiments.

FIG. 3 illustrates an embodiment of a view of the back of the SDR device. The back of the SDR device shows example options for an attachment mechanism 11, 12, which can come in different sizes, and can be used with another feature such as a hook, a clip, or pin 13 or a necklace, a lanyard, a nametag, a strap, a bracelet, or a string (not shown). The SDR device can be attached to a person's clothing or other wearables in a variety of ways, including safety pin 11, 12, of different sizes, clamps, hooks, and adhesives 14, and so on. A back indent 14 allows access to internal elements of the device, such as battery replacement.

Figure 4:
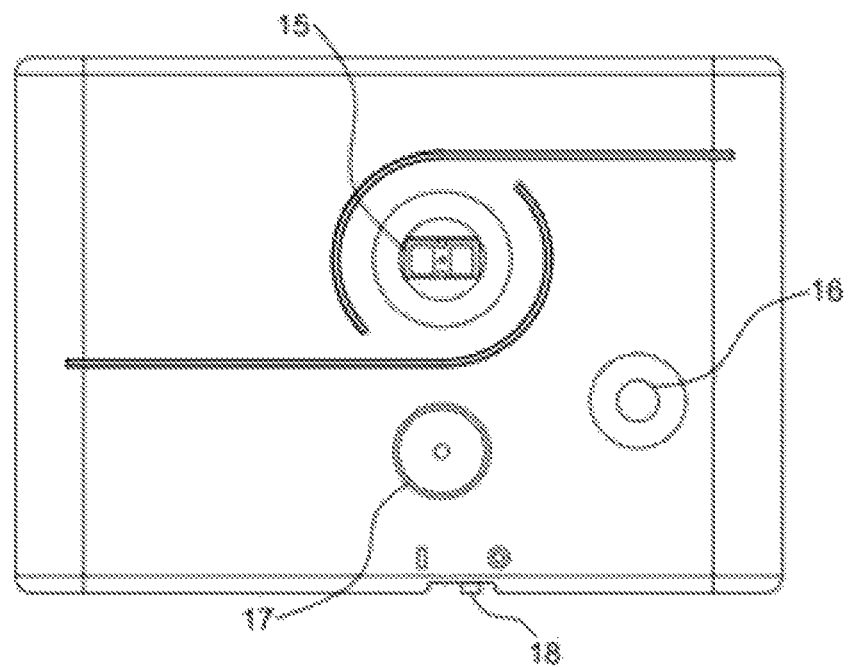
FIG. 4 illustrates a model of the front of the device, according to embodiments.

FIG. 4 illustrates another, front, view of the SDR device. Shown are a sensor 15, LED 16. In one embodiment, the LED 16 is activated by the sensor 15. Depending on the distance zone, the color can change from green, the "safer" zone to yellow, the "close to danger" zone, and to red, the "danger" zone. The LED 16 emits the green light when it detects 8 feet to 7 feet. The LED 16 shines orange or yellow or a like color when the sensor 15 detects a person within 7 feet to 6 feet range from the device. The LED 16 shows red light when another person approaches and breaches the preset distance, such as that of 6 feet. The button 17 and the power switch 18 are also illustrated. In accordance with an embodiment, calculations and instructions are given by a processing unit, a processor or a microprocessor a chip can be activated by a power source controlled by the on/off switch and by a motion detected by the sensor 3. The sensor, once it detects a person within its zone of detection, for example 12 feet from it, it sends a signal to the processor. If the sensor detects an object which happens to enter the distance of less than 9 feet but more than 7 feel, for example, the device can start emitting a green light. If that distance is determined to be between 7 and 6 feet, the light would switch to yellow and/or an additional signal or alert may be added to the light, for example an auditory message, a warning to not come any closer. A tactile alert can also be used. If the distance is less than 6 feet, the light would change to red and another type of an alert can be added, for example an auditory alert that informs that social distance has been breached. The user of the device then receives and interprets the alerts and can now act upon the user's new knowledge.

Figure 5:
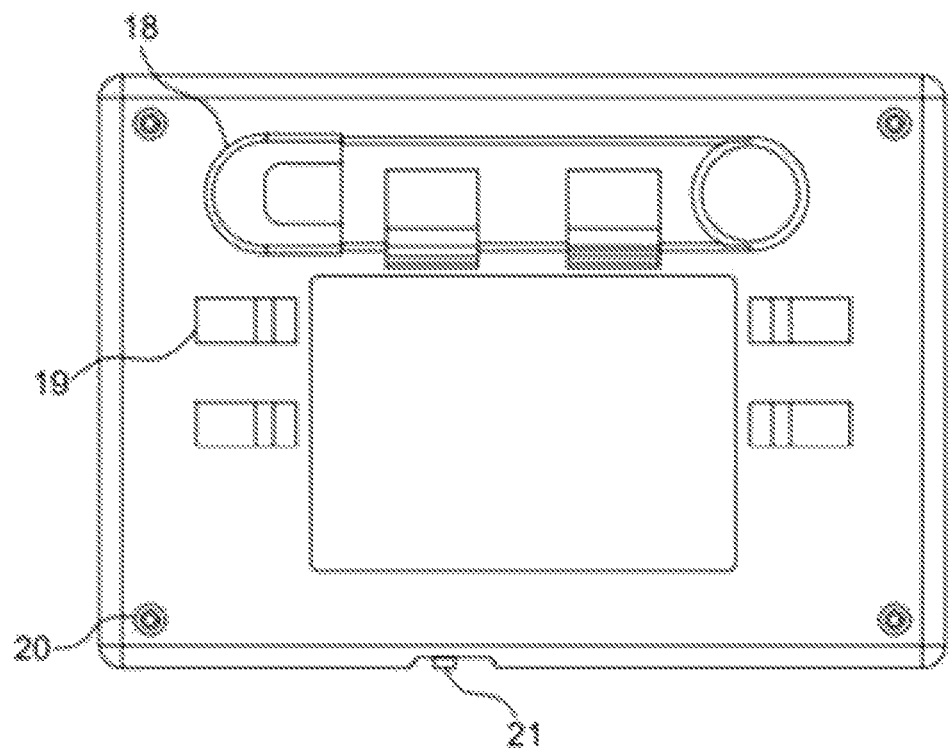
FIG. 5 illustrates a model of the back of the device, according to embodiments.

FIG. 5 shows another view of the back of the SDR device. In one embodiment, a safety pin 18 can be snapped in place. Hooks 19 are configured to hold the attaching pin. There can be different sets of hooks 19 configured to facilitate easy attachment to a person's external clothing. The power switch 21 is also illustrated and the placement is configured to allow ease of access.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Other embodiments include combinations and sub-combinations of features described or shown in the drawings herein, including for example, embodiments that are equivalent to: providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, feature or features can refer to the structures and/or functions of an apparatus, article of manufacture or system, and/or the steps, acts, or modalities of a method.

What is claimed is:

1. A method for signaling to maintain a desirable preset distance between persons, the method comprising:
   detecting, by a sensor of a wearable social distance reminder (SDR) configured to be worn by a wearer, a person approaching the SDR within a zone of detection, wherein the zone of detection comprises at least three zones including a safe zone, a close-to-danger zone, and a danger zone;
   activating a processor by the sensor to determine whether the person approaching the SDR is detected within a zone requiring a signal; and
   upon determining that the person approaching the SDR is within a zone requiring the signal, triggering a feedback module to emit the signal, wherein the signal is configured to convey an urgency level depending on detection of the person approaching the SDR within one of the at least three zones.

2. The method of claim 1 wherein the safe zone is more than 8 feet from the SDR, the close-to-danger zone is between 7 and 8 feet from the SDR, and the danger zone is 6 and less than 6 feet from the SDR.

3. A method for signaling to maintain a desirable preset distance between persons, the method comprising:
   detecting, by a sensor of a wearable social distance reminder (SDR) configured to be worn by a wearer, a person approaching the SDR within a zone of detection, wherein the zone of detection comprises at least three zones including a safe zone, a close-to-danger zone, and a danger zone;
   activating a processor by the sensor to determine whether the person approaching the SDR is detected within a zone requiring a signal;
   upon determining that the person approaching the SDR is within a zone requiring the signal, triggering a feedback module to emit the signal, wherein the signal is configured to convey an urgency level depending on detection of the person approaching the SDR within one of the at least three zones; and
   further wherein the signal emitted when the person not wearing the SDR is in the zone of detection, in the close-to-danger, or in the danger zone is configured to change in at least one of a visual, auditory, tactile, intensity output.

4. The method of claim 3 wherein the signal emitted to the wearer is of different type than the signal emitted to the person approaching the SDR.

* * * * *